(12) United States Patent
Armstrong et al.

(10) Patent No.: US 7,878,460 B2
(45) Date of Patent: Feb. 1, 2011

(54) AIRCRAFT WING SLAT

(75) Inventors: David J. Armstrong, Luton (GB); Glen R. Pringle, Wellingborough (GB); Maxwell E. Brown, St. Albans (GB)

(73) Assignee: GKN Aerospace Services Limited (GB)

( * ) Notice: Subject to any disclaimer, the term of this patent is extended or adjusted under 35 U.S.C. 154(b) by 754 days.

(21) Appl. No.: 11/507,373

(22) Filed: Aug. 21, 2006

(65) Prior Publication Data
US 2007/0045477 A1 Mar. 1, 2007

Related U.S. Application Data

(60) Provisional application No. 60/711,954, filed on Aug. 26, 2005.

(30) Foreign Application Priority Data
Aug. 25, 2005 (GB) ................... 0517609.4

(51) Int. Cl.
*B64C 3/50* (2006.01)
*B64D 15/12* (2006.01)
(52) U.S. Cl. .................. 244/214; 244/134 D
(58) Field of Classification Search ............... 244/214, 244/134 A, 134 D, 134 R
See application file for complete search history.

(56) References Cited

U.S. PATENT DOCUMENTS

| | | | | | |
|---|---|---|---|---|---|
| 2,938,992 | A | * | 5/1960 | Crump | 219/528 |
| 3,022,412 | A | * | 2/1962 | Waters | 219/549 |
| 3,524,610 | A | | 8/1970 | Alvarez-Calderon | |
| 3,711,039 | A | * | 1/1973 | James | 244/214 |
| 3,917,193 | A | | 11/1975 | Runnels, Jr. | |
| 3,940,093 | A | | 2/1976 | Cabriere | |
| 4,189,120 | A | * | 2/1980 | Wang | 244/214 |
| 4,399,970 | A | * | 8/1983 | Evans | 244/214 |
| 4,615,499 | A | * | 10/1986 | Knowler | 244/134 B |

(Continued)

FOREIGN PATENT DOCUMENTS

EP 0045988 2/1982

(Continued)

OTHER PUBLICATIONS

U.K. Search Report dated Dec. 19, 2005 for related GB Application No. GB0517609.4.

(Continued)

*Primary Examiner*—Tien Dinh
*Assistant Examiner*—Joseph W Sanderson
(74) *Attorney, Agent, or Firm*—Quarles & Brady LLP

(57) ABSTRACT

An aircraft wing slat for mounting to a leading portion of an aircraft wing includes a main body section and a forward section, wherein the forward section is demountable from or releasably secured to the main body section. The forward section may have a nose skin with an electrically powered heater. The electrically powered heater may be integral with the nose skin and may be microporous such that it is integrated into surrounding dielectric to contribute to the mechanical strength of the nose skin. A demountable forward section of an aircraft wing slat, a main body section of an aircraft wing slat arranged to receive a demountable forward section, an aircraft wing and an aircraft wing slat with a nose skin with an electrically powered heater are also disclosed.

16 Claims, 4 Drawing Sheets

U.S. PATENT DOCUMENTS

| | | | | |
|---|---|---|---|---|
| 4,741,499 A * | 5/1988 | Rudolph et al. | ......... | 244/134 B |
| 4,752,049 A * | 6/1988 | Cole | ....................... | 244/134 B |
| 4,753,402 A * | 6/1988 | Cole | ......................... | 244/210 |
| 4,880,189 A * | 11/1989 | Day | ........................... | 244/214 |
| 4,915,327 A * | 4/1990 | Ellmers et al. | .............. | 244/210 |
| 5,114,100 A * | 5/1992 | Rudolph et al. | .......... | 244/134 C |
| 5,839,699 A * | 11/1998 | Bliesner | ..................... | 244/214 |
| RE38,024 E * | 3/2003 | Adams et al. | .......... | 244/134 D |
| 6,642,490 B2 * | 11/2003 | Feher | ........................ | 219/679 |
| 7,137,596 B2 * | 11/2006 | Garrigus et al. | ......... | 244/134 R |
| 7,249,735 B2 * | 7/2007 | Amorosi et al. | ............ | 244/99.2 |
| 7,264,206 B2 * | 9/2007 | Wheaton et al. | ............ | 244/214 |
| 7,270,305 B2 * | 9/2007 | Rampton et al. | ............ | 244/214 |
| 7,322,547 B2 * | 1/2008 | Konings | .................... | 244/214 |
| 7,469,862 B2 * | 12/2008 | Layland et al. | ......... | 244/134 D |
| 7,513,458 B2 * | 4/2009 | Layland et al. | ......... | 244/134 D |
| 2003/0122037 A1 * | 7/2003 | Hyde et al. | ............. | 244/134 A |
| 2006/0038088 A1 * | 2/2006 | Dodson | ...................... | 244/214 |

FOREIGN PATENT DOCUMENTS

| | | |
|---|---|---|
| EP | 0068737 | 1/1983 |
| EP | 0222421 | 5/1987 |
| EP | 0939028 A3 | 9/1999 |
| EP | 1338506 A1 | 8/2003 |
| GB | 2417469 A | 3/2006 |

OTHER PUBLICATIONS

U.K. Searrch Report dated Jun. 27, 2006 for related GB Application No. GB0517609.4.

* cited by examiner

DE-MOUNTABLE NOSESKIN / HEATER BLANKET

AIRCRAFT WING SLAT

CROSS-REFERENCE TO RELATED APPLICATIONS

This application claims the benefit of U.S. Provisional Patent Application Ser. No. 60/711,954, filed Aug. 26, 2005, entitled AIRCRAFT WING SLAT, which application is incorporated by reference herein in its entirety, and claims priority to United Kingdom Patent Application No. 0517609.4, filed Aug. 25, 2005, entitled AIRCRAFT WING SLAT.

FIELD OF THE INVENTION

The present invention relates to an aircraft wing slat, in particular an aircraft wing slat for a leading portion of an aircraft wing.

BACKGROUND OF THE INVENTION

Wing slats are mounted to the leading portion of an aircraft wing and are moveable relative to the wing to manoeuvre the aircraft during flight.

A wing slat is generally heated to reduce the build up of ice which could interfere with the operation of the wing slat to the detriment of the safety of the aircraft. Currently most civil aircraft wing slat designs use hot gas for ice protection purposes. Such technology employs bleeding air from the engines, and ducting the bled air to the wing slat via tubes. The hot air is finally distributed to the slat nose skin via small holes in the tubes. The system is mainly suitable where the aircraft structure is fabricated of sheet metal, and can more easily withstand the temperature of the hot gasses from the engine. The slat is generally fabricated as a one-piece riveted structure in such a way as to create a pressure box for the hot gas bounded by the nose skin to the front, and a nose beam to the rear. The system is not efficient, as it cannot discriminate what part of the wing slat structure to heat up, and resultantly ice protect.

The ice protection system for the aircraft wing slat requires periodic maintenance, usually requiring removal of the wing slat. Removal of the wing slats renders the aircraft out of service during this maintenance which incurs a considerable inconvenience and loss of revenue to the aircraft operator. Furthermore, damage to the leading edge wing slats by impacts, particularly from vehicles servicing the aircraft at an airport, are a common occurrence. Damaged wing slats require time consuming removal, sourcing of a replacement wing slat and fitting and re-alignment of the replacement wing slat to the wing. This procedure is time consuming, again causing considerable inconvenience and loss of revenue to the aircraft operator.

It is an aim of an embodiment of the present invention to alleviate at least one of the problems discussed above.

SUMMARY OF THE INVENTION

According to a first aspect of the present invention there is provided an aircraft wing slat for mounting to a leading portion of an aircraft wing, the aircraft wing slat comprising a main body section and a forward section, wherein the forward section is demountable from or releasably secured to the main body section.

As the forward section of the wing slat is demountable from the main body section, if the forward section is damaged for any reason, such as an impact, then just this damaged forward section can be removed and replaced. This is a far simpler and quicker operation than removing the whole moveable wing slat, and subsequent refitting which requires time consuming realignment, saving valuable time and associated operating costs. Furthermore it is far less expensive to replace just a demountable forward section of a wing slat than the entire wing slat.

The forward section of the wing slat preferably has a nose skin with an electrically powered heater.

Providing an electrically powered heater in the forward section of the wing slat enables the wing slat to be protected against ice build up. When the ice protection system requires periodic maintenance, just the forward section of the wing slat may be removed and replaced rather than the entire moveable wing slat which requires precise re-alignment when being refitted so that the ice protection system may receive maintenance 'off-site' whilst the aircraft continues in service. Again, this reduces the time during which the aircraft is out of service reducing costs.

The provision of an electrically powered heater in the forward section of the wing slat to assist protection against ice build up enables the tubes for ducting of hot air in conventional wing slats to be omitted. This provides considerable cost and weight savings enabling the internal structure of the wing slat to be redesigned to provide the demountable forward section.

Furthermore, as the forward section of the wing slat is electrically heated, hot gasses do not need to be bled from the engines. Bleeding hot gasses from the engines reduces their efficiency, generally by several per cent.

The nose skin of the forward section of the wing slat preferably includes an integral heater. The mechanical properties of the heater and associated dielectric then contribute to the strength of the nose skin. This provides a stronger and lighter overall structure with enhanced thermal conductivity. The heater is preferably microporous to be integrated into the surrounding dielectric in the forward section of the wing slat.

According to a second aspect of the present invention there is provided a demountable forward section of an aircraft wing slat to be releasably mounted onto a main body portion of an aircraft wing slat.

According to a third aspect of the present invention there is provided a main body section of an aircraft wing slat for mounting to a leading portion of an aircraft wing, the main body section being arranged to receive a demountable forward section.

According to a fourth aspect of the present invention there is provided an aircraft wing with an aircraft wing slat for mounting to a leading portion of the aircraft wing, the aircraft wing slat comprising a main body section and a forward section wherein the forward section is demountable from the main body section.

According to a fifth aspect of the present invention there is provided an aircraft wing slat for mounting to a leading portion of an aircraft wing, the aircraft wing slat having a nose skin with an electrically powered heater.

BRIEF DESCRIPTION OF THE DRAWINGS

An example of the present invention will now be described with reference to the accompanying drawings, in which.

DETAILED DESCRIPTION OF THE PREFERRED EMBODIMENTS OF THE INVENTION

Figure 1:
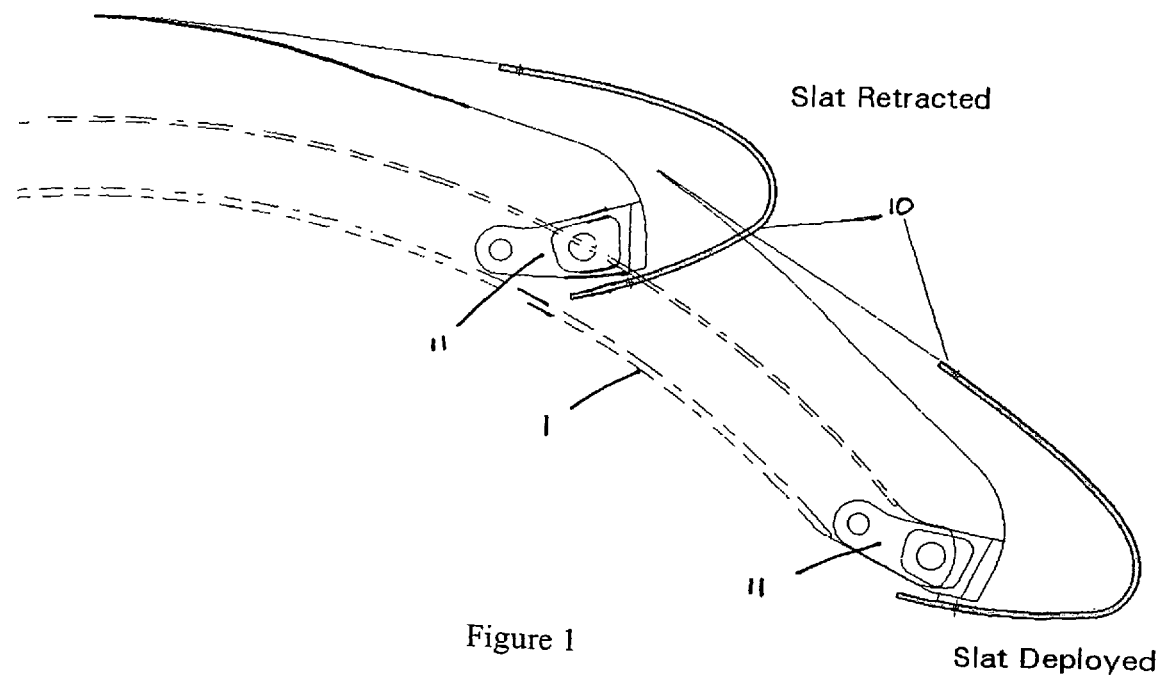
FIG. 1 shows a cross-sectional side view of a wing slat in deployed and retracted positions on a portion of a wing.
Figure 2:
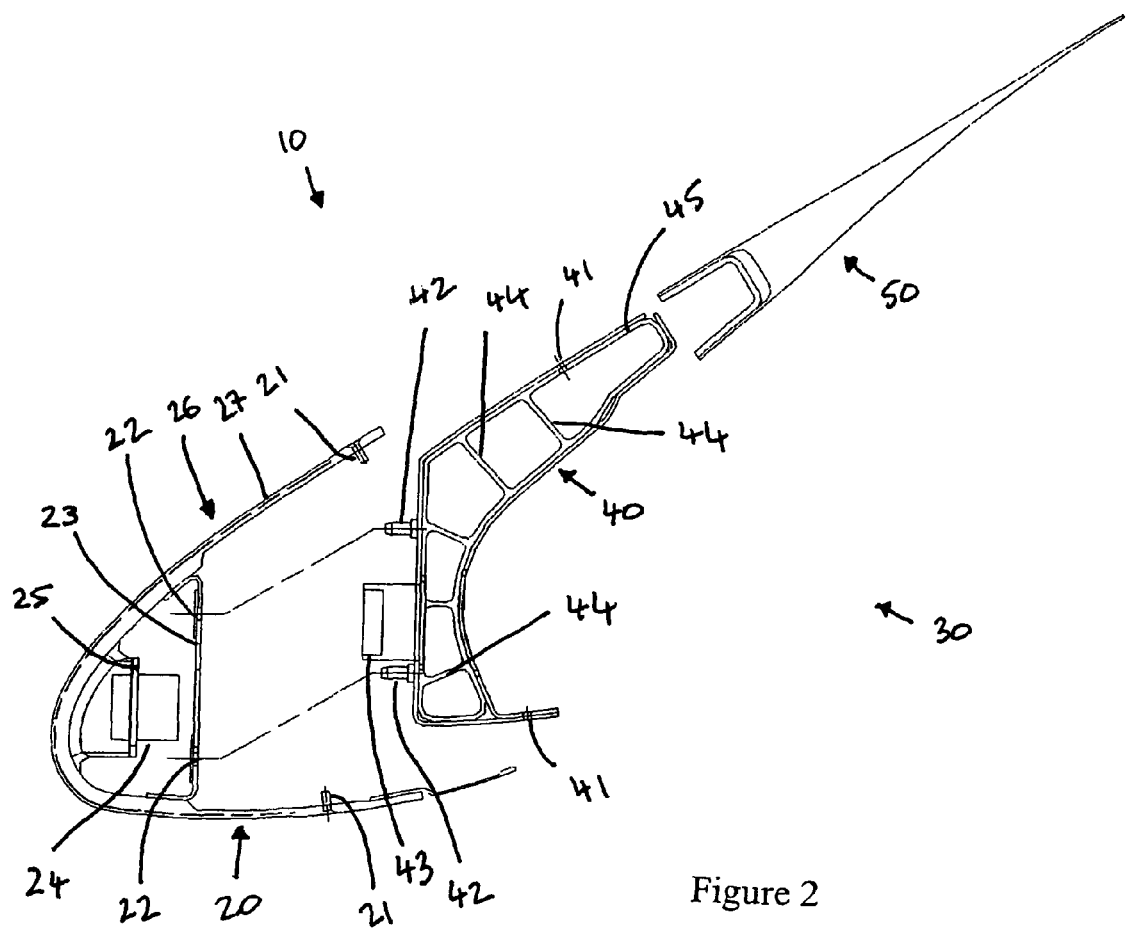
FIG. 2 shows a cross-sectional side view of a partially disassembled wing slat.

As shown in FIG. 1, a wing slat 10 is to be provided on a leading portion of an aircraft wing shown schematically by dotted lines 1. The wing slat 10 is provided on an articulated arm 11 to move it between deployed and retracted positions. The wing slat 10 comprises a forward section 20 and a main body section 30 as shown in FIG. 2. In this example the main body section 30 comprises a centre section 40 and an aft section or trailing edge wedge (TEW) 50. As shown in FIG. 2, the forward section 20 is demountable from or releasably secured to the main body section 30.

During use, the forward section 20 may be releasably secured to the centre section 40 of the main body section 30 by any suitable means. However, the forward section 20 is preferably secured to the centre section 40 by a securing means that enables the forward section 20 to be removed and replaced quickly and easily, such as the retaining screws 21 on the forward section 20 to be secured in corresponding holes 41 in the centre section 40 and the shear pins 42 on the centre section 40 to be secured in corresponding sockets 22 mounted on the forward section 20. In this example sockets 22 are mounted on a support 23 on the forward section 20. In this example a further securing means is used in the form of interconnecting sections 24, 43, one of which 24 is provided on a further support 25 on the forward section 20 and the other 43 is provided on the centre section 40. One of the interconnecting sections 24, 43 may be a plug and the other may be a socket. In the example shown in FIG. 2, interconnecting section 24 is a plug and interconnecting section 43 is a socket. However, they could, of course, be the other way around. The support 23 shown in FIG. 2 would have a suitable orifice to enable interconnecting section 43 to pass therethrough to be joined to corresponding interconnecting section 24.

Centre section 40 would generally contain actuation elements (shown as articulated arms 11 in FIG. 1) to enable the wing slat 10 to be moved between deployed and retracted positions relative to the front of a wing to which it is mounted. The centre section 40 has structural beams 44 to provide strength to the centre section 40. The centre section 40 would generally by designed as a torque box.

In the example shown in FIG. 2, the aft section 50 is mounted on an end portion 45 of the centre section 40. In this example the aft section 50, like the forward section 20, is also demountable.

The nose skin 26 of the forward section 20 is provided with an electrically powered heater shown by dashed lines 27 in FIG. 2. The heater 27 shown in FIG. 2 is integrated into the structure of the nose skin 26 of the forward section 20.

Figure 3:
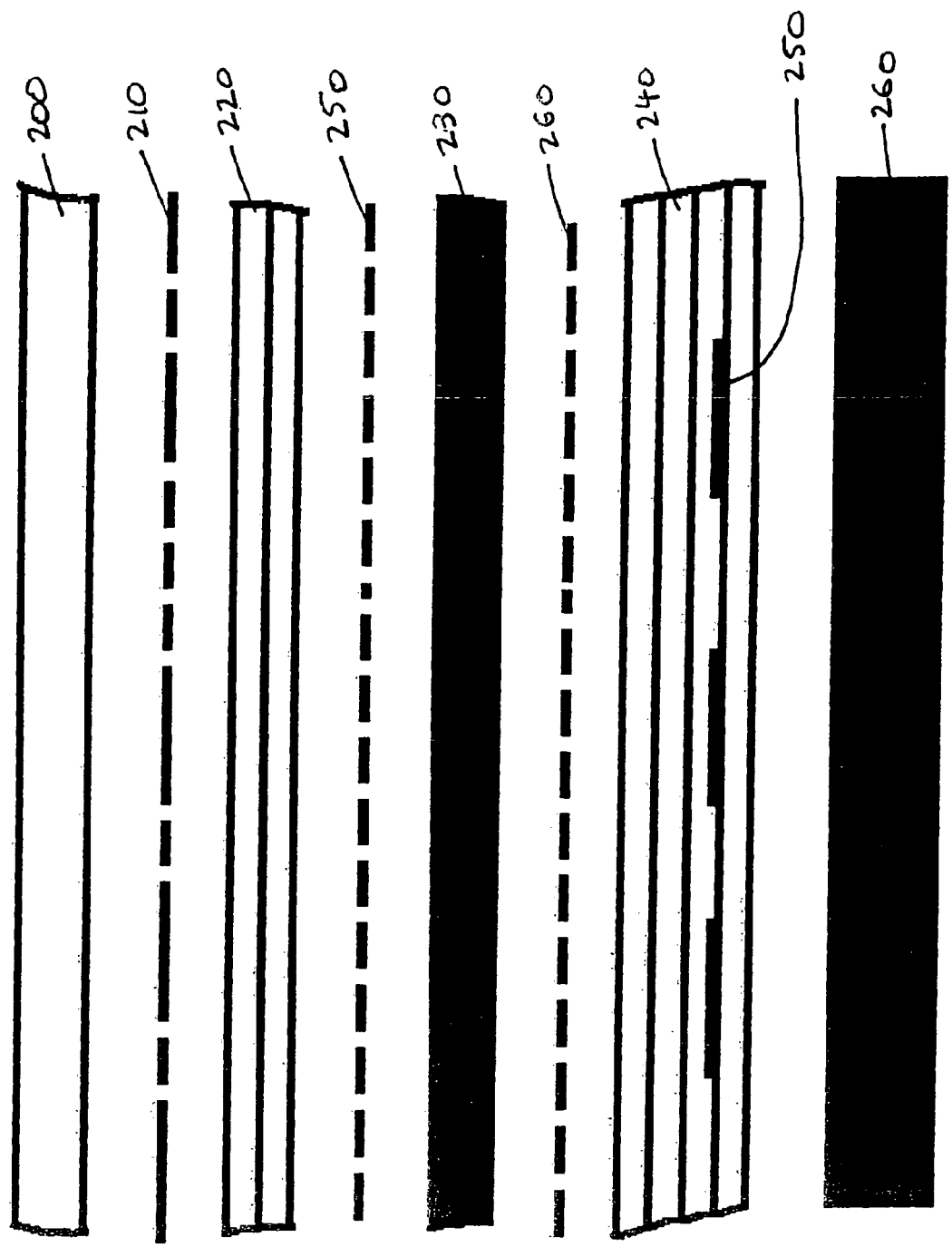
FIG. 3 shows a schematic example of the construction of the nose skin of the leading edge of a wing slat forward section.

FIG. 3 shows a schematic example of the construction of the nose skin 26 of the forward section 20. In this example an erosion shield 200 is provided to act as the outside surface during use. The erosion shield may be made of titanium and/or aluminium to protect against lightning strikes. A bonding layer 210 is provided to bond the erosion shield 200 to an outer dielectric 220 which may, for example, be made from preimpregnated glass cloth.

A heater 230 is provided between the outer dielectric 220 and an inner dielectric 240 which may also be made from preimpregnated glass for example. The heater 230 in this example is microporous to be integrated into the inner and/or outer dielectric layers 220, 240 to be integral with the nose skin of the forward section 20. As the heater 230 is integrated into the inner and/or outer dielectric layers 220, 240 this allows the mechanical properties of the heater and dielectric layers to contribute to the mechanical structural strength of the nose skin 26 making it more robust and lighter. Furthermore, as the heater 230 is integrated into the dielectric layer 220 this improves thermal transfer from the heater 230 to the outer erosion shield 200 where ice is liable to build up. The microporous heater 230 may be made from fibres such as nickel coated carbon tissue or sprayed metal particles typically between 5-30 μm in diameter to integrate into one or both dielectric layers 220, 240 to provide a stronger structure with good resistance to fatigue. When a microporous heater is used, optional bonding or adhesive layers 250, 260 are not required between the heater 230 and each of the dielectric layers. However, as well as the microporous conductors described above, the heater 230 could additionally or alternatively be provided by solid conductors such as one or more wires or foil. If the heater is provided by solid conductors then the bonding or adhesive layers 250, 260 are generally required. The inner dielectric 240 in this example is provided with busbars 250 to provide power to the heater 230.

The inner dielectric 240 is joined to a structural element 260 to provide further strength to the nose skin. The structural element 260 does not have to be as thick or heavy as conventional nose skins because of the strength provided by the heater 230 which is preferably integrated into one or both dielectric layers 220, 240. This reduces production costs and weight of the structure, reducing fuel costs for the aircraft on which it is provided. The structural element may be solid carbon/glass laminate or a corded structure for example.

The structure described in FIG. 3 could be fabricated beginning with the erosion shield 200 as described above or beginning with the structural element 260 and applying the layers in the reverse order or in any other order.

Figure 4:
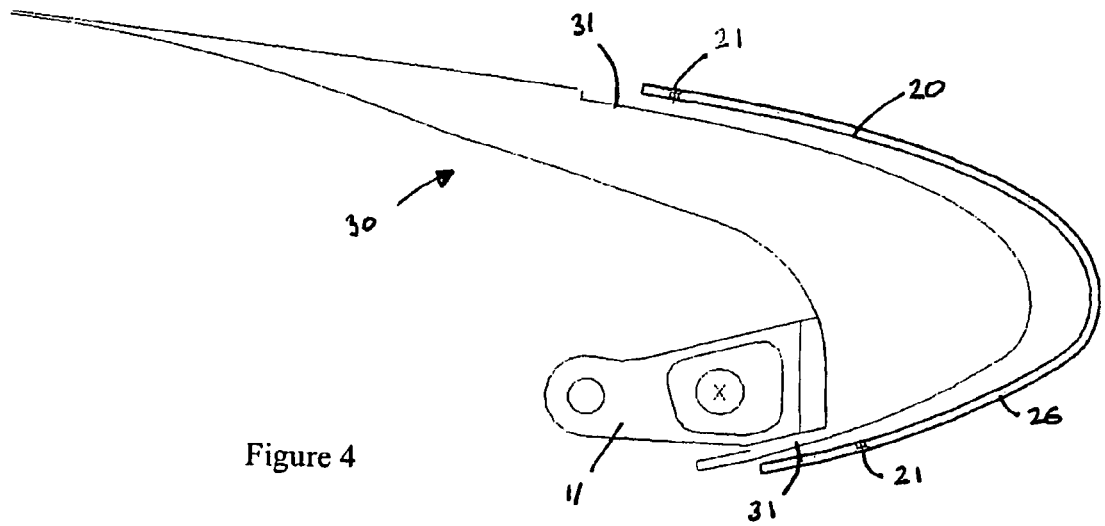
FIG. 4 shows a cross-sectional side view of a wing slat with a demountable noseskin including a heater blanket and FIG. 5 shows a top view of segmented wing slats provided on the wing of an aircraft.

As shown in FIG. 4, the demountable or releasably securable forward section 20 of the wing slat 10 could comprise the noseskin 26. The demountable forward section 20 may be releasably secured to the remaining main body section 30 by any suitable means. However, the forward section 20 is preferably secured to the main body section 30 by a securing means that enables the forward section 20 to be removed and replaced quickly and easily, such as by the retaining screws 21 on the forward section 20 to be secured in corresponding holes 31 in the remaining main body section 30. As in the example of FIG. 2, the demountable noseskin 26 of FIG. 4 includes an integral heater blanket which may be constructed as in the examples shown in FIGS. 2 and 3 above.

Figure 5:
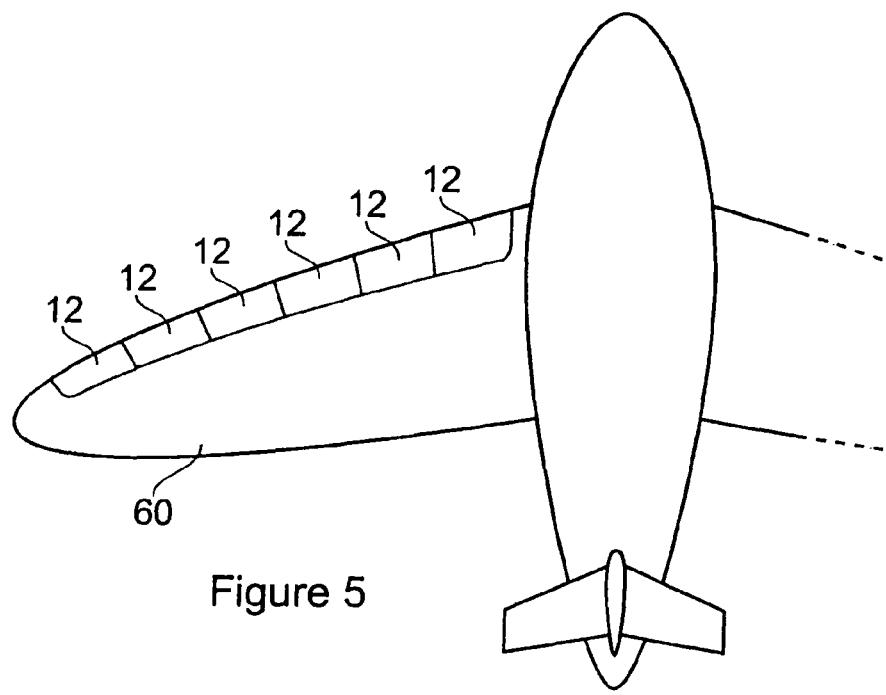

As shown in the top view of an aircraft wing 60 of FIG. 5, the wing slat 10 may be segmented into a number of shorter lengths 12. The provision of a plurality of segmented wing slats 12 enables just one damaged segmented wing slat 12 to be replaced if damaged rather than a longer non-segmented wing slat 10 which further simplifies maintenance and reduces turn around time. For example a wing slat may be divided into six 1 meter long segmented wing slats 12 as shown in FIG. 5.

Many variations may be made to the example described above whilst still falling within the scope of the invention. For example a demountable forward section could be provided with a heating element applied in a non-integrated manner, if the enhanced strength, reduction in weight and improved thermal transfer advantages of integration of the heater into the dielectric are not required.

The invention claimed is:

1. An aircraft wing slat for mounting to a leading portion of an aircraft wing, the aircraft wing slat comprising:
   a main body section; and
   a forward section having a nose skin including an integral heater;
   wherein the forward section is configured to be demounted from the main body section, by means of a selectively releasable securing means arranged to secure releasably the forward section to the main body section; and
   wherein the forward section is configured to be mounted in a fixed manner when mounted to the main body section.

2. An aircraft wing slat according to claim 1, wherein the releasable securing means comprises one or more of retaining screws, shear pins and a plug and socket.

3. An aircraft wing slat according to claim 1, wherein the integral heater is an electrically powered heater comprising a conductive material configured to resistively heat the nose skin.

4. An aircraft wing slat according to claim 3, wherein the electrically powered heater is microporous and is integrated into a surrounding dielectric.

5. An aircraft wing slat according to claim 3, wherein the heater is provided by solid conductors.

6. An aircraft wing slat according to claim 5, wherein the solid conductors are one or more wires.

7. An aircraft wing slat according to claim 5, wherein the solid conductors are foil.

8. An aircraft wing slat according to claim 3, wherein the nose skin includes a structural element.

9. An aircraft slat according to claim 3, wherein the forward section nose skin includes an erosion shield.

10. An aircraft wing slat according to claim 1 comprising a plurality of wing slat segments to be mounted adjacent to each other on a leading portion of an aircraft wing.

11. The aircraft wing slat according to claim 1, wherein the forward section substantially wraps around a forward part of the main body section and retaining screws attach the a rearward portion of the forward section to holes in the main body section.

12. The aircraft wing slat according to claim 11, wherein the retaining screws attach the forward section to the main body section on a top side of the aircraft wing slat and on a bottom side of the aircraft wing slat.

13. The aircraft slat according to claim 12, wherein a shear pin on one of the forward section and the main body section engages a socket on the other and is configured such that during mounting of the forward section onto the main body section, the shear pin first engages the socket while holes in the forward section and main body section are aligned for receiving the retaining screws and, upon insertion of the retaining screws to secure the forward section and the main body section together, the shear pin substantially limits a type of load applied to the retaining screws to a shear load.

14. An aircraft wing with an aircraft wing slat for mounting to a leading portion of the aircraft wing, the aircraft wing slat comprising a main body section and a forward section having a nose skin including an integral heater wherein the forward section is configured to be demounted from the main body section; and
   wherein the forward section is configured to be mounted in a fixed manner when mounted to the main body section.

15. An aircraft wing slat for mounting to a leading portion of an aircraft wing, the aircraft wing slat comprising a nose skin with an integral heater in which the nose skin with the integral heater is configured to be demounted from the aircraft wing slat; and
   wherein the nose skin is configured to be mounted in a fixed manner when mounted to the aircraft wing slat.

16. An aircraft wing slat according to claim 15, wherein the integral heater is microporous and is integrated into surrounding dielectric.

* * * * *